US005686188A

United States Patent [19]

Brandt et al.

[11] Patent Number: 5,686,188
[45] Date of Patent: Nov. 11, 1997

[54] GLASS CONTAINER TRANSPARENT COATING SYSTEM

[75] Inventors: Thomas L. Brandt, Windsor; Daniel N. Willkens, Elmira, both of N.Y.

[73] Assignee: Brandt Technologies, Inc., Windsor, N.Y.

[21] Appl. No.: 475,107

[22] Filed: Jun. 7, 1995

Related U.S. Application Data

[62] Division of Ser. No. 131,572, Oct. 4, 1993, abandoned, which is a continuation of Ser. No. 928,652, Aug. 17, 1992, abandoned, which is a continuation of Ser. No. 431,968, Nov. 6, 1989, abandoned, which is a continuation-in-part of Ser. No. 267,877, Nov. 7, 1988, abandoned.

[51] Int. Cl.$^6$ ............................ B32B 17/10; B32B 27/34
[52] U.S. Cl. ..................... 428/435; 65/60.1; 65/60.2; 65/60.3; 427/165; 427/389.7; 427/407.2; 428/431
[58] Field of Search .................... 427/54.1, 165, 427/389.7, 407.2; 65/60.1–60.3; 428/216, 215, 430, 431, 435, 442, 41; 215/DIG. 6; 118/319, 322

[56] References Cited

U.S. PATENT DOCUMENTS

| | | | |
|---|---|---|---|
| 3,823,686 | 7/1974 | Snyder | 118/314 |
| 3,889,030 | 6/1975 | Arrandale, Jr. | 428/215 |
| 3,921,575 | 11/1975 | Ishii et al. | 118/322 |
| 4,053,666 | 10/1977 | Taylor et al. | 215/DIG. 6 |
| 4,065,589 | 12/1977 | Lenard et al. | 215/12 R X |
| 4,075,363 | 2/1978 | Shank, Jr. | 427/27 |
| 4,092,953 | 6/1978 | Waugh | 118/642 |
| 4,093,759 | 6/1978 | Otsuki et al. | 215/DIG. 6 X |
| 4,098,932 | 7/1978 | Frische | 427/374 R |
| 4,098,934 | 7/1978 | Brockway et al. | 428/35 |
| 4,224,365 | 9/1980 | Ali-Zaidi | 428/35 |
| 4,225,049 | 9/1980 | Inoue | 215/12 R |
| 4,264,658 | 4/1981 | Tobias et al. | 428/35 |
| 4,265,497 | 5/1981 | Shank | 215/DIG. 6 X |
| 4,278,711 | 7/1981 | Sullivan | 427/284 |
| 4,311,250 | 1/1982 | Ravve et al. | 220/458 |
| 4,525,425 | 6/1985 | Church | 428/428 |
| 4,730,575 | 3/1988 | Jenkins | 118/47 |
| 4,731,289 | 3/1988 | Coleman | 428/334 |
| 4,882,210 | 11/1989 | Romberg et al. | 215/DIG. 6 |
| 4,940,613 | 7/1990 | Golino | 428/34.7 |
| 4,985,517 | 1/1991 | Yezrielev et al. | 526/208 |
| 5,182,148 | 1/1993 | Kapp et al. | 428/34.65 |
| 5,215,622 | 6/1993 | Schmelzer | 156/566 |

FOREIGN PATENT DOCUMENTS

52-21939  8/1971  Japan.

OTHER PUBLICATIONS

*Handbook of Chemistry & Physics*, 59th Ed., p. C464, 1978.
PTO Translation of JP52–21939.

*Primary Examiner*—Robert J. Warden
*Assistant Examiner*—Krisanne M. Thornton
*Attorney, Agent, or Firm*—Sughrue, Mion, Zinn, Macpeak & Seas

[57] ABSTRACT

A topcoating for glass containers that will be abrasion resistant, present a high gloss finish, afford increased impact resistance. A method for in-line high speed application to glass containers and curing of the topcoating is disclosed. The topcoating will retain its adhesion to the glass container throughout the various food and beverage packaging operations as well as handling in the marketplace and by the consumer.

16 Claims, 1 Drawing Sheet

GLASS CONTAINER TRANSPARENT COATING SYSTEM

REFERENCE TO RELATED APPLICATIONS

This application is a continuation of application Ser. No. 08/131,572, filed Oct. 4, 1993, now abandoned, which is a continuation of application Ser. No. 07/928,652, filed Aug. 17, 1992, now abandoned, which is a continuation of application Ser. No. 07/431,968, filed Nov. 6, 1989, and now abandoned, which is a continuation-in-part of application Ser. No. 07/267,877, filed Nov. 7, 1988, and now abandoned. This application is related to applications Ser. Nos. 07/432,442, 07/432,441 and 07/431,967, all filed Nov. 6, 1989, the disclosures of which are incorporated by reference herein.

BACKGROUND OF THE INVENTION

The present invention is directed to a technique for protecting glass containers, and more particularly to a technique for applying a coating to protect a label and impart high impact and abrasion resistance to the glass container.

There is an ongoing program in the container industry to reduce the weight of the container by reducing wall thickness. Specifically, this is being accomplished by more uniformly distributing the glass throughout the container, i.e., moving glass from the heavy wall areas to the inherently thinner wall areas, while at the same time reducing the amount of glass used, thereby reducing the weight. How thin the glass may be and still meet internal pressure and external impact requirements is influenced largely by the strength of the glass and the geometry of the container.

The benefits of reduced weight are economic: lower glass melting fuel and material costs, higher container manufacturing speeds (lower cost) and reduced product shipping costs.

Another factor influencing the strength of any given container is the degree to which the outer surface has been scratched, abraded or flawed, where this surface damage occurs and how subsequent internal pressure or external forces are applied. Because of the countless combinations possible, it is beneficial to protect the outer glass container surface from damage.

To date, protection of the outer surface of the container has been accomplished by surface treatment during the container manufacturing process, using vapor and spray devices to provide lubricity to the contact surfaces before the containers are subjected to the potentially damaging automatic conveying, inspection, washing, filling and labeling operations.

During those conveying operations, the containers are subject to considerable line pressures as well as abrading of one container against another. Surface damage may result and, if severe enough, may result in a weakened bottle.

As glass container production rates increase, the frequency and severity of impact and abrasion increases.

The very thin films provided by the techniques practiced today provide some abrasion protection but little impact protection.

SUMMARY OF THE INVENTION

It is an object of the present invention, with certain variations, to overcome the above-described limitations of prior art glass container surface protection and to foster further glass container weight reductions without increasing risks to the consumer.

More particularly it is an object of this invention to provide a glass container coating which is durable, highly impact resistant and which enhances the appearance of the glass container to which it is applied.

It is a further object of the invention to provide a coating which can be used not only to provide impact and abrasion resistance to the container itself but which can also be used to overlay and protect a label applied to a container, and which improves the labeled container appearance, durability and impact resistance as well.

It is a further object of the invention to provide a technique for producing the coated containers at production line rates, i.e., 500 containers/minute.

These and other objects and advantages of the invention are achieved by using heat- or UV-curable acrylic materials as container protection coatings. One such material is a UV-curable acrylic composed of film formers, resins, reactive diluents and additives and butyl acetate solvents. The material is typically sprayed on the bottle, solvent flashed off and the remaining solids cured with ultraviolet light. The resulting coating is at once scratch and abrasion resistant, impact resistant and retains a high gloss throughout its life. Impact resistance of containers with a nominal 0.6 mil coating of the topcoat has been demonstrated at 30% to 40% greater than like containers with existing surface treatments. Other demonstrations of water immersion for extended time have been successfully concluded with no loss of adhesion or abrasion resistance.

BRIEF DESCRIPTION OF THE DRAWINGS

The invention will be more clearly understood from the following description in conjunction with the accompanying drawing, which illustrates a bottle processing system for practicing the present invention.

DETAILED DESCRIPTION OF THE INVENTION

Figure 1:
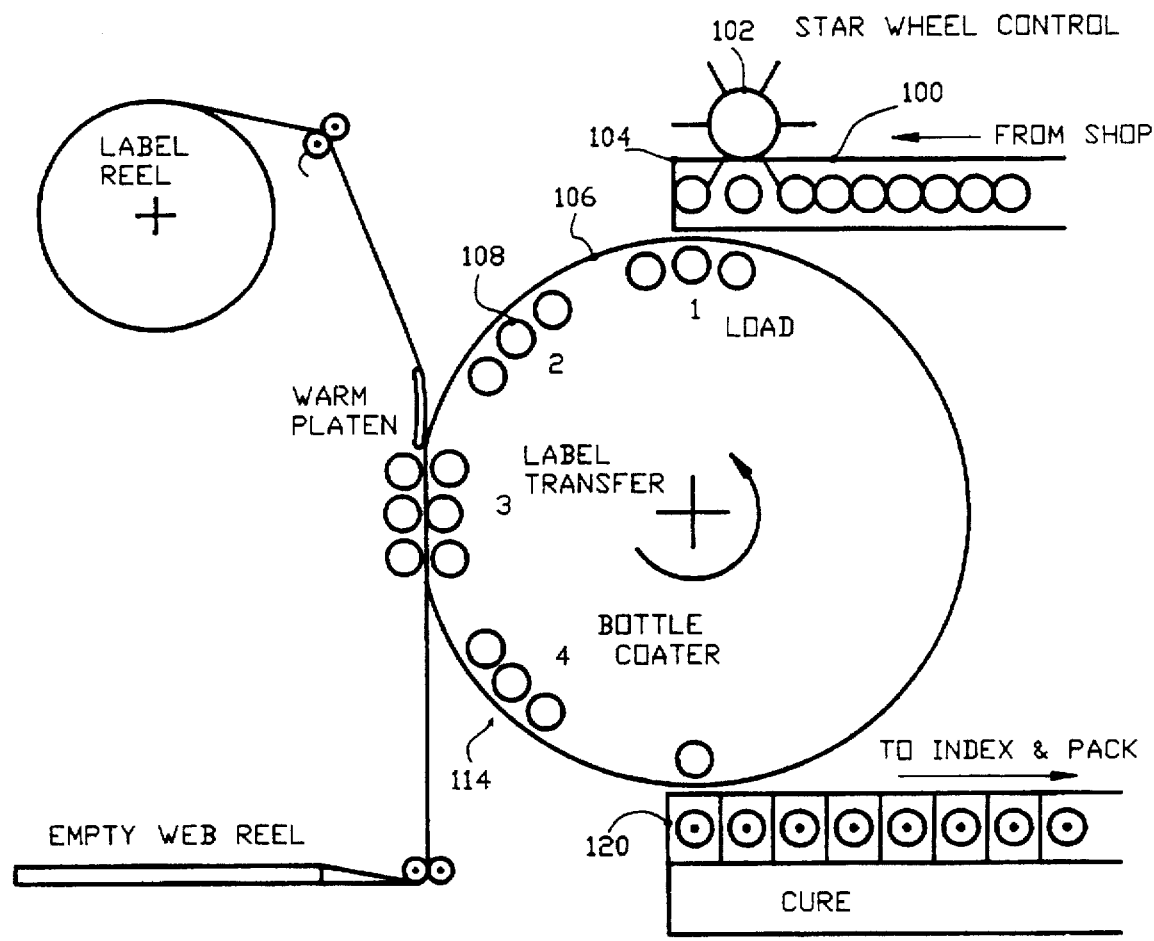

The method described can be scaled for various production rates and be operated in line with container production.

It is common practice in the glass container industry to coat the container outer surface with a tin oxide film prior to annealing and with a second film, e.g., polyethylene, after annealing. According to this invention, the tin oxide film is eliminated and a film of a material such as ammonium stearate is deposited after annealing. The topcoat and ammonium stearate are compatible with one another, to insure optimum adhesion of the topcoat to the glass surface while also providing lubricity adequate for conveying through the glass plant operations prior to application of the topcoat.

If operated in conjunction with a labelling system such as disclosed in copending U.S. patent application identified by Ser. No. 07/432442 filed concurrently herewith, the bottles are container is heated to a temperature of 200° F. in any one of a number of ways familiar to those of skill in the art, and the labelling operation would occur after the container heating.

The coating solution would be applied after the labelling, and suitable coating materials to be used are heat cured acrylic and ultraviolet (UV) curable acrylic available from PPG Industries, Inc. One such material is a UV-curable acrylic identified as R796Z80, which is composed of film formers, resins, reactive diluents and additives and butyl acetate solvents. The material is typically sprayed on the bottle, the solvent flashed off and the remaining solids cured with ultraviolet light.

If the coating is to be colored blue, or if it is desired to have a UV blocking function, the use of a UV-curable acrylic becomes difficult and a heat-curable acrylic may be used instead.

The resulting coating is at once scratch and abrasion resistant, impact resistant and retains a high gloss throughout its life. Impact resistance of containers with the topcoat has been demonstrated at 30% to 40% greater than like containers with existing surface treatments. Other demonstrations of water immersion for extended time have been successfully concluded with no loss of adhesion or abrasion resistance.

To receive the coating, the containers are conveyed into a multi-station spray system which has been designed to address the needs of uniform coverage of the container, recycling of the overspray, and recovery and re-use of the evaporated solvent. The residual heat in the container is adequate to flash off the solvent at an accelerated rate. The flashing off of the solvent will occur at the elevated bottle temperature in the labelling system described above and in copending application Ser. No. 07/432442. If no such labelling system is used, other heating must be provided, e.g., hot air, to prevent trapping of solvent which would otherwise weaken the coating.

Sufficient space is allowed between the spray booth and the cure chamber for flash to occur.

In the event the materials are sprayed, it is desirable to prevent any material from contacting the finish of the container. This is the area including the opening, top seal surface, thread or closure cover area and protuberance immediately below. This could be accomplished using a container gripper device designed to completely cover the area described above, e.g., with a split housing which, when closed, dovetails to form a barrier to the spray material. Dipping and flow coating are other processes that may be used to apply the coating.

The gripper devices are attached to a conveyor network whose design allows for spacing of the glass containers to optimize the coating and curing of the coating materials. The grippers should also be designed for rotating the container at the spraying and curing positions to insure uniform coating and processing.

Rather than spraying, the application of the coating solution could be accomplished by belt or roller coating as described in copending application Ser. No. 07/432442 identified above. Alternative methods of applying the topcoat include, but are not limited to the use of a roller shaped to conform to the contour of the container, a belt flexible enough to conform to the container contour, or flowing the coating over the container while it is slowly rotated. Dipping may also be advantageous. Each option, has its own merits and must be weighed against economics, quality and production rates.

The containers are then conveyed to an ultraviolet light cure chamber designed to provide the necessary ultraviolet light exposure to completely cure the topcoat. It has been demonstrated that an energy level of 300 watts/in. for 6 seconds insures a complete cure. This is at a distance of 6" from the U-V System Lamp.

Immediately following cure of the topcoat, the container can be packaged for shipment and subsequent wash, filling and pasteurization, if required, by the various food and beverage packaging operations.

The single FIGURE herein illustrates the use of the present invention in conjunction with the labelling system described in copending application Ser. No. 07/432442. The coating with ammonium stearate would be performed before the bottles are received at the upper right of the FIGURE along a conveyor 100. The bottles would then be transferred to a loading station 104 one at a time by a star wheel control device 102. The bottles are then moved downwardly onto an indexing table 106 by means of a suitable placement device. The indexing table 106 will include container holders, e.g., suction holders or the like, which are arranged in groups of three, with each group of three being arranged rectilinearly. There may be supports at the neck of each container to absorb pressure during the container transfer.

After loading three bottles onto the indexing table 106, the indexing table is then rotated counterclockwise from the loading station to a container orienting station generally designated at reference character 108. If desired or necessary for the particular type of container and label being used, the container may here be rotated to a particular orientation, although this will be unnecessary in many container labeling systems. The rotating of the container would preferably be performed by rotation of individual container holder suction cups on the indexing table 106 until the correct position is detected, e.g., by suitable photo-electric means, at which point the holders would be locked in their correct positions. (If locked, they will have to be unlocked prior to the label application step, as the label application step requires rotation of the bottles as will be described in more detail below.)

If it is desirable to burn off residual lubricant, this can be done at station 108, in addition to proper orienting of the bottles, preferably by an oxidizing flame but alternatively by other means such as corona treatment. This is generally not necessary in the preferred embodiment herein, since the ammonium stearate appears to be sufficiently evaporated by the residual heat of the bottles.

After proper orienting of the bottles and removal of lubricant, the indexing table 106 is further rotated to bring the bottles to the label transfer station where the labels are applied, and the indexing table is then rotated to a coating station 114 where the coating of this invention is applied. As described in copending application Ser. No. 432,442, the coating thickness may be approximately 0.5 mil over the label and 1.0 mil over the remainder of the bottle. Also, as indicated above herein, a 0.6 mil coating over the entire bottle may be sufficient.

The indexing table 106 is then further rotated to bring the labeled and coated bottles to an unloading station where each container is off-loaded onto a container conveyor. There are a number of ways in which the bottles could be removed. All bottles could be removed from the indexing table 106 to a single conveyor 120, taking care to ensure that the coatings are not disturbed. It may, be necessary, with suitable care taken, to use an air knife. It may, however, be necessary to move the bottles by clamping them at their "finish" and carrying them onto the conveyor 120 in a known manner.

It is also to be remembered that the bottles are held in groups of three on the indexing table 106. In the interest of speed, it would be possible to arrange three separate conveyors 120 each for receiving one of the three bottles in each group from the indexing table 106.

Once on the conveyor 120, the coating on the bottles is cured in a suitable manner, e.g., by heat or U-V energy. It has been demonstrated that air moving at 1500 ft./min. and at a temperature of 550° F. will insure a complete cure in 1.5 minutes. For speed, it would be desirable to position U-V lamps on either side of each container. If desirable, it would also be possible to rotate each container by 90° during the curing process to provide full coverage of the container by the opposing lamps. After the curing process, the conveyor 120 carries the bottles to a further container inspection area (if desired) and thence to a packing or filling station.

A topcoating material as described herein will increase abrasion and impact resistance of the glass container, will be waterproof and unaffected by the contents of any food or beverage, will be glossy and will not be abraded by like material, and will cover flaws and irregularities on the surface of glass containers such as to render them nearly invisible. It will also bond to a protective label.

It will be appreciated that further modifications could be made to the embodiment disclosed above while still obtaining may of these advantages and without departing from the spirit and scope of the invention as described in the appended claims.

What is claimed is:

1. A method of producing a coated glass container, said method comprising the steps of:

providing a glass container;

annealing said glass container;

applying a first coating material at a first location in a container processing system subsequent to said annealing;

conveying said container to a second location in said container processing system with said first coating providing lubricity during conveyance;

applying a heat-curable acrylic coating in liquid form over a substantial portion of the exterior of said glass container while at least some of said first coating material remains on said container, said acrylic coating being applied at a thickness of no greater than about 0.001 inch; and curing said acrylic coating.

2. A method according to claim 1, wherein said curing step comprises heating said container, with said coating material being substantially cured in no more than approximately 1.5 minutes.

3. A method according to claim 1, further comprising the step of heating said container after application of said first coating material and prior to application of said second coating material.

4. A method according to claim 1, further comprising the step of applying a label to said container prior to application of said acrylic coating.

5. A method according to claim 1, wherein said acrylic material covers at least portions of flaws and irregularities on the surface of said container to decrease the visibility thereof to the human eye.

6. A method according to claim 1, wherein said thickness is no greater than about 0.0006 inch.

7. A method according to claim 6, wherein said thickness is no greater than about 0.0005 inch.

8. A method according to claim 1, wherein said glass container is a container for containing a liquid under pressure.

9. A method according to claim 6, wherein said glass container is a container for containing a liquid under pressure.

10. A method according to claim 7, wherein said glass container is a container for containing a liquid under pressure.

11. A method according to claim 1, wherein said first coating material is ammonium stearate.

12. A method of producing a coated container, said method comprising the steps of providing an annealed container at a first location in a container processing system, conveying said container to a second location in said container processing system, heating said container, applying a heat-curable acrylic coating in liquid form over a substantial portion of the exterior of said heated container at a thickness of no greater than about 0.001 inch, and curing said acrylic coating.

13. A method according to claim 12, wherein said container is a glass container.

14. A method according to claim 12, further comprising the steps of applying a first coating material at said first location in said container processing system after annealing said container, and conveying said container to said second location in said container processing system with said first coating providing lubricity, wherein said step of heating said container is sufficient to evaporate excess first coating material, and said heat curable acrylic coating is applied after said evaporation.

15. A method according to claim 14, wherein no metal oxide coating is applied to said container at any time prior to application of said first coating material.

16. A method according to claim 15, wherein said first coating material is ammonium stearate.

* * * * *